(12) United States Patent
Lee et al.

(10) Patent No.: US 11,763,042 B2
(45) Date of Patent: Sep. 19, 2023

(54) COMPUTER PROGRAM FOR PREVENTING INFORMATION SPILL DISPLAYED ON DISPLAY DEVICE AND SECURITY SERVICE USING THE SAME

(71) Applicant: TERUTEN, INC, Seoul (KR)

(72) Inventors: Young Lee, Seoul (KR); Young Yi Yu, Yangju-si (KR)

(73) Assignee: TERUTEN, INC, Seoul (KR)

( * ) Notice: Subject to any disclaimer, the term of this patent is extended or adjusted under 35 U.S.C. 154(b) by 170 days.

(21) Appl. No.: 17/362,906

(22) Filed: Jun. 29, 2021

(65) Prior Publication Data

US 2022/0414273 A1 Dec. 29, 2022

(51) Int. Cl.
| | | |
|---|---|---|
| *G06F 21/84* | (2013.01) | |
| *G06F 21/74* | (2013.01) | |
| *G06F 3/14* | (2006.01) | |
| *G10L 25/51* | (2013.01) | |
| *G06V 20/52* | (2022.01) | |

(52) U.S. Cl.
CPC ............ *G06F 21/84* (2013.01); *G06F 3/14* (2013.01); *G06F 21/74* (2013.01); *G06V 20/52* (2022.01); *G10L 25/51* (2013.01)

(58) Field of Classification Search
CPC ............. G06F 21/84; G06F 3/14; G06F 21/74
See application file for complete search history.

(56) References Cited

U.S. PATENT DOCUMENTS

| | | | | |
|---|---|---|---|---|
| 8,781,296 B2* | 7/2014 | Kim | ................ | H04N 21/44236 386/239 |
| 9,591,173 B2* | 3/2017 | Santos | ............... | H04N 1/00846 |
| 11,113,420 B2* | 9/2021 | Du | ........................ | G06F 21/629 |
| 11,271,963 B2* | 3/2022 | Manadhata | ......... | H04L 63/1458 |
| 11,399,039 B2* | 7/2022 | Rubin | .................... | G06F 21/554 |
| 2019/0220584 A1* | 7/2019 | Schiller | .................. | G06F 21/31 |
| 2020/0177753 A1* | 6/2020 | Kubo | .................. | H04N 1/2166 |
| 2021/0110071 A1* | 4/2021 | Buesser | .................. | G06F 21/84 |
| 2022/0067219 A1* | 3/2022 | Robinson | ................ | G06F 21/84 |
| 2022/0171889 A1* | 6/2022 | Ke | .......................... | G06F 21/84 |

FOREIGN PATENT DOCUMENTS

| | | |
|---|---|---|
| KR | 100568956 | 2/2005 |
| KR | 101643936 | 7/2016 |
| KR | 1020180116866 | 10/2018 |
| KR | 101925799 | 12/2018 |

* cited by examiner

*Primary Examiner* — Viral S Lakhia

(57) ABSTRACT

A non-transitory computer-readable storage medium storing a computer program stored in a computer readable storage medium is provided. The computer program causing a computer to prevent an illegal leakage of an image displayed on a display device of the computer includes receiving operation mode information from a server after the computer is booted, determining whether an operation mode of the computer program is a photographing attempt prevention mode or a violation detection mode based on the operation mode information, determining whether communication between the server and the computer is possible, executing the photographing attempt prevention mode when the operation mode is the photographing attempt prevention mode and the communication is possible, and executing forcibly the photographing attempt prevention mode even if the operation mode is the violation detection mode when the operation mode is the violation detection mode and the communication is not possible.

5 Claims, 4 Drawing Sheets

Smartphone Photographing Has Been
Detected !

23:42:11
May 02, 2020

~GUI1

190

23:42:11
May 02, 2020

~GUI2

COMPUTER PROGRAM FOR PREVENTING INFORMATION SPILL DISPLAYED ON DISPLAY DEVICE AND SECURITY SERVICE USING THE SAME

TECHNICAL FIELD

The present invention relates to a security computer program, and particularly to a computer program or a computer program product that can prevent illegal and unauthorized photographing and leakage of information, displayed on a display device and requiring security, using a capture camera of an illegal photographer, and secretly detect the illegal photographer, a computer-readable storage medium storing the computer program stored in a computer readable storage medium, and a method of providing security services using the same.

BACKGROUND ART

A capture prevention program has a function of blocking capture by a capture program. Some capture prevention programs have a function of inserting a watermark to protect security-required data that is displayed on a display device.

SUMMARY

An object of the present invention is to provide a computer program or a computer program product that can change, when an illegal photographer captures (or photographs) a security-required image displayed on a display device of a computer using his or her capture camera illegally and unauthorizedly, the image to another image to block the capture of the image according to settings by an administrator or display the image as it is to secretly detect the illegal photographer, and a security service using the computer program.

An object of the present invention is to provide a computer program or a computer program product that can detect (or photograph) an act of an illegal photographer attempting to capture or capturing a security-required image displayed on a display device of a computer using his or her capture camera illegally and unauthorizedly (for example, an act of taking a photo with the capture camera or an act of recording moving images) using a camera connected to the computer, and capture an evidence image of the illegal photographer using the camera in real time while changing, at the same time, the image displayed on the display device to another image in real time according to a result of the detection, and a security service using the computer program.

An exemplary embodiment of the present invention is directed to a non-transitory computer-readable storage medium storing a computer program stored in a computer readable storage medium, the computer program causing a computer to prevent an illegal leakage of an image displayed on a display device of the computer, including receiving operation mode information from a server after the computer is booted, determining whether an operation mode of the computer program is a photographing attempt prevention mode or a violation detection mode based on the operation mode information, determining whether communication between the server and the computer is possible, executing the photographing attempt prevention mode when the operation mode is the photographing attempt prevention mode and the communication is possible, and executing, when the operation mode is the violation detection mode and the communication is not possible, forcibly the photographing attempt prevention mode even if the operation mode is the violation detection mode.

Another exemplary embodiment of the present invention is directed to a method of providing an illegal leakage prevention service of an image displayed on a display device of a computer, including setting, by an administrator, operation mode information to a server using an administrator computer, requesting, by a computer program, a transmission of the operation mode information to the server after the computer executing the computer program is booted, determining, by the computer program, whether an operation mode of the computer program is a photographing attempt prevention mode or a violation detection mode based on the operation mode information transmitted from the server, determining, by the compute program, whether communication between the server and the computer is possible, executing, by the computer program, the photographing attempt prevention mode when the operation mode is the photographing attempt prevention mode and the communication is possible, and executing, by the computer program, the photographing attempt prevention mode forcibly even though the operation mode is the violation detection mode when the operation mode is the violation detection mode and the communication is not possible.

DETAILED DESCRIPTION OF EMBODIMENTS

Figure 1:
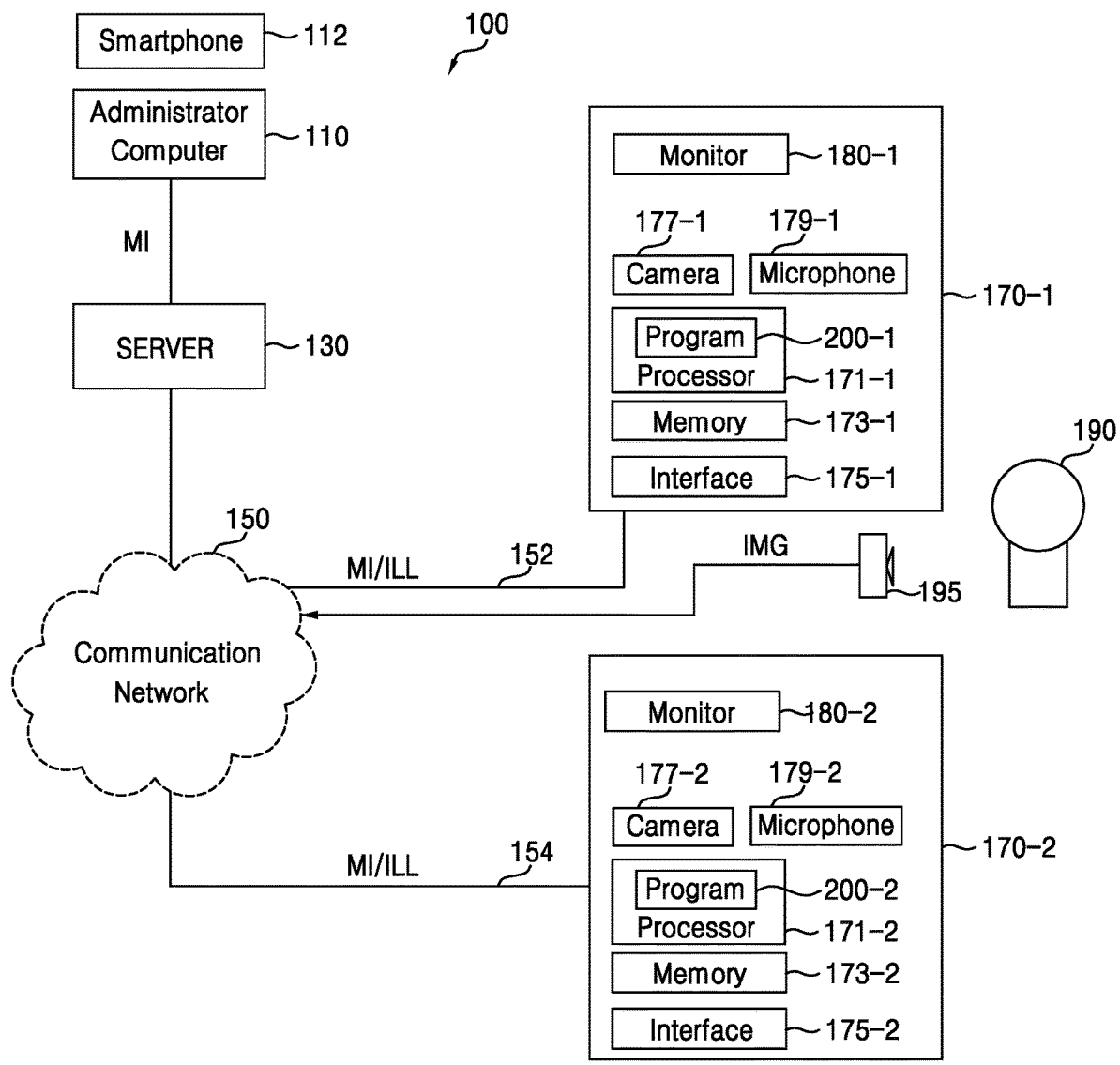
FIG. 1 is a block diagram of a security service system that prevents a leakage of information displayed on a display device.

FIG. 1 is a block diagram of a security service system for preventing a leakage of information displayed on a display device. A system or a security service system 100 for providing an illegal leakage prevention service of an image includes an administrator computer 110, a server 130, a communication network 150, a plurality of user computers 170-1 and 170-2, and a camera 195. According to embodiments, the security service system 100 may further include an administrator mobile device (for example, a laptop computer or a smartphone 112).

An administrator may set operation mode information (MI) indicating an operation mode of a computer program to the server 130 using the administrator computer 110, and the server 130 receives the operation mode information (MI) and stores it in a storage device (for example, a memory or a database) that may be accessed by the server 130. Each of computer programs 200-1 and 200-2 connects to the server 130 during an operation or at the time of completion of booting, and reads the operation mode information (MI) stored in the storage device.

Each of the computer programs 200-1 and 200-2 operates in a photographing attempt prevention mode or in a violation detection mode according to the operation mode information (MI).

Since a screen lock function is activated in the photographing attempt prevention mode, the computer program 200-1 or 200-2 immediately blocks an image (this is also referred to as "information" or "screen") currently displayed on a display device (for example, a monitor 180-1 or 180-2), or immediately changes it to another image as photographing (or a photographing attempt) using a camera of an illegal photographer 190 (this is also referred to as a "capture camera." The capture camera includes an electronic device having a photographing function, like a camera or a camera of a smartphone) is detected (or sensed), or as separation of peripheral devices (for example, a camera, a microphone, and/or a communication cable) is detected.

As the image is blocked or changed, the illegal photographer 190 who has attempted to photograph the image (or who has photographed the image) without authority, without permission, or illegally may recognize that photographing of the image is prohibited or that the computer program 200-1 or 200-2 for information security is currently operating.

However, since the screen lock function is deactivated in the violation detection mode, the computer program 200-1 or 200-2 may maintain an image currently displayed on a display device such as the monitor 180-1 or 180-2 as it is even though a photographing attempt (or photographing) using his or her capture camera of the illegal photographer 190 is detected, or a separation of peripheral devices is detected by the computer program 200-1 or 200-2.

As a display of the image is maintained as it is, the illegal photographer 190 who has photographed the image without authority, without permission, or illegally may not recognize that photographing of the image is prohibited or that the computer program 200-1 or 200-2 is currently operating. As a result, the illegal photographer 190 may continue photographing.

For example, the photographing attempt prevention mode has a strong purpose of warning against the illegal photographer 190, but the violation detection mode (this is also referred to as a violation uncovering mode or a violation catching mode) has a strong purpose of secretly detecting (this is also referred to as an uncovering or catching) the illegal photographer 190 rather than the purpose of warning. Therefore, only the administrator may set the operation mode information (MI) to the server 130.

The server 130 may transmit the operation mode information (MI) to each of the user computers 170-1 and 170-2 through respective cables 152 and 154 connected to the communication network 150. According to the embodiment, the server 130 may transmit the operation mode information (MI) to each of the user computers 170-1 and 170-2 in response to an operation mode information transmission request transmitted from each of the user computers 170-1 and 170-2.

A first user computer 170-1 is electrically connected to the communication network 150 through a first cable 152, and a second user computer 170-2 is electrically connected to the communication network 150 through a second cable 154.

Each of the user computers 170-1 and 170-2 may be a personal computer (PC) or a portable computer, and the portable computer may be a laptop computer, a mobile internet device (MID) or a wearable computer, but the present invention is not limited thereto, and it may be any computing devices used for various tasks.

The first user computer 170-1 includes a processor 171-1 executing a computer program 200-1, a memory 173-1, an interface 175-1, a camera 177-1, a microphone 179-1, and a monitor 180-1.

The memory 173-1 used as a storage medium for storing the computer program 200-1 stores data to be used by the computer program 200-1 and/or data generated by the computer program 200-1.

The interface 175-1 collectively refers to interfaces connected to the first cable 152, the camera 177-1, and the microphone 179-1. The monitor 180-1 is an example of a display device that displays information (for example, an image) output from the processor 171-1 or the computer program 200-1. Electronic documents of various types (or formats) that are displayed on a display device such as the monitor 180-1 or 180-2 for various tasks and require security are referred to as images.

The second user computer 170-2 includes a processor 171-2 executing a computer program 200-2, a memory 173-2, an interface 175-2, a camera 177-2, a microphone 179-2, and a monitor 180-2.

The memory 173-2 used as a storage medium for storing the computer program 200-2 stores data to be used by the computer program 200-2 and/or data generated by the computer program 200-2. Each of the memories 173-1 and 173-2 may be a non-transitory computer readable medium storing each of the computer programs 200-1 and 200-2. Each of the memories 173-1 and 173-2 collectively refers to a volatile memory such as DRAMs and a non-volatile memory such as a flash memory.

The interface 175-2 collectively refers to interfaces connected to the second cable 154, the camera 177-2, and the microphone 179-2. The monitor 180-2 is an example of a display device that displays an image output from the processor 171-2 or the computer program 200-2.

The camera 195 is a camera different from the computer cameras 177-1 and 177-2, and collectively refers to one or more cameras installed on a wall or ceiling for security.

Although the cables 152 and 154 are shown in FIG. 1, each of the user computers 170-1 and 170-2 may include a wireless transceiver (for example, a WiFi transceiver, a Bluetooth transceiver, or the like) for wireless communication with the server 130 by connecting to the wireless communication network 150 wirelessly without using each of the cables 152 and 154 according to embodiments.

Figure 2:
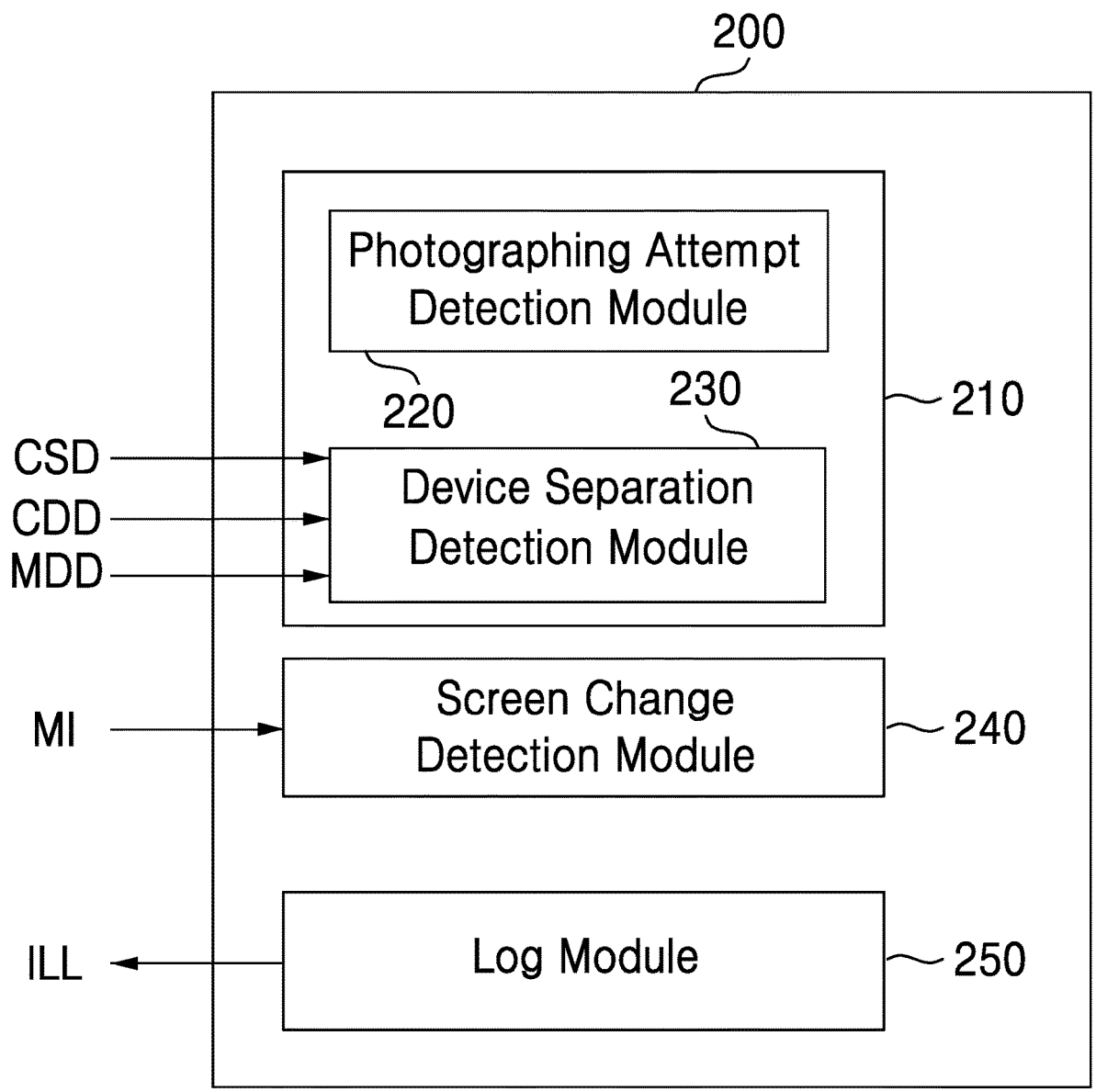
FIG. 2 is a functional block diagram of a computer program that prevents the leakage of information displayed on the display device of FIG. 1.

FIG. 2 is a functional block diagram of a computer program that prevents a leakage of information displayed on the display device of FIG. 1. The computer program (200-1 and 200-2 are collectively referred to as "200") for information security (or image security) includes a detection module 210, a screen change control module 240, and a log module 250.

A module (this is referred to as program code means) herein refers to functional and/or structural combinations that are combined with hardware (for example, a user computer or a processor within the computer) and causes the hardware to perform commands (or program codes) for detecting a photographing attempt, changing a screen, and generating and transmitting a log. The computer program 200 including the modules 210, 240, and 250 is stored in a hardware-readable recording medium (this is also referred to as a hardware-readable storage medium, or a computer readable storage medium). The example of the hardware-readable recording medium may be a memory 173-1 or 173-2.

It is assumed that the computer programs 200-1 and 200-2 have the same function and structure, and a function and a structure of the computer program 200-1 (this is referred to as "200") which is executed in the first user computer 170-1 will be described with reference to FIG. 2.

The detection module 210 includes a photographing attempt detection module 220 (this is also referred to as a photographing attempt detection program or photographing attempt detection program codes) and a device separation detection module 230 (this is also referred to as a device separation detection program or device separation detection codes).

The photographing attempt detection module 220 uses a deep learning technology (or a deep learning model) to learn a shape of each of capture cameras that may be used for illegal photographing, a lens shape of each of the capture cameras, a flashlight of each of the capture cameras, or photographing sound of each of the capture cameras, to detect photographing (or a photographing attempt) of security-required image that is displayed on the monitor 180-1 according to a result of the learning, and to transmit a result of detecting the photographing attempt to the screen change control module 240 (this is also referred to as a screen change control program or screen change control program codes) and the log module 250 (this is also referred to as a log program or log program codes).

The device separation detection module 230 detects a signal CSD indicating disabling of the camera 177-1, a signal CDD indicating disabling of the microphone 179-1, and/or a signal MDD indicating disabling of the first cable 152 (or a wireless transceiver installed in the first user computer 170-1), and transmits a result of the device separation detection to the screen change control module 240 and the log module 250. The examples of peripheral devices of the computer 170-1 include the camera 177-1, the microphone 179-1, and the first cable (152, or the wireless transceiver installed in the first user computer 170-1); however, the present invention is not limited thereto.

Here, disabling includes separating or removing a corresponding device (for example, the camera 177-1, the microphone 179-1, the cable 152, and/or the wireless transceiver installed in the first user computer 170-1) from the first user computer 170-1, removing a wire for supplying an operation voltage to the device, and the like. Disabling includes consequences of disabling the device.

The screen change control module 240 determines whether to convert an image currently displayed on the monitor 180-1 (for example, an electronic document created (or an electronic document being created) by a word processor, a still image, or a moving image) into another image or to maintain the image as it is according to the operation mode information MI, a result of the photographing attempt detection, and a result of the device separation detection.

For example, when the operation mode information MI defines (or indicates) the photographing attempt prevention mode, the screen change control module 240 changes an image currently displayed on the monitor 180-1 to another image according to a result of the photographing attempt detection (or a result of first detection) and/or a result of the device separation detection (or a result of second detection).

However, when the operation mode information MI defines (or indicates) the violation detection mode, the screen change control module 240 maintains an image currently displayed on the monitor 180-1 as it is even though a result of the photographing attempt detection and/or a result of the device separation detection is input.

In response to the result of the photographing attempt detection and/or the result of the device separation detection, the log module 250 generates a violation log ILL including an IP address of the first user computer 170-1, a MAC address of the first user computer 170-1, a time of an attempt to photograph the monitor 180-1, a photo of an illegal photographer who has attempted to photograph the monitor 180-1, and/or a photo of an image captured by the illegal photographer (that is, an image or electronic document displayed on the monitor 180-1).

The photo of an illegal photographer (that is, an evidence photo) may be a photo taken by the camera 177-1 and/or the camera 195. For example, even if an illegal photographer disables or removes any one of the cameras 177-1 and 195, the other one of the cameras 177-1 and 195 may track a movement of the illegal photographer and photograph a face of the illegal photographer as an evidence.

The photo of an image or an electronic document captured by an illegal photographer is used to check which data, which document, or which image the illegal photographer has taken as a picture using his or her capture camera, and the log module 250 may capture an image captured by the illegal photographer using the capture camera by controlling a screen capture program in response to a result of the photographing attempt detection and/or a result of the device separation detection. According to embodiments, the computer program 200 may provide a screen capture function.

When the violation log ILL can be immediately transmitted to the server 130, the log module 250 can immediately transmit the violation log ILL to the server 130 through the first cable 152 and the communication network 150, and the server 130 can transmit the received violation log ILL to the administrator computer 110.

According to embodiments, when a phone number of the smartphone 112 of the administrator is set in the log module 250 in advance, the log module 250 can transmit (or transmit simultaneously) the generated violation log ILL to the administrator computer 110 and the smartphone 112.

However, when the violation log ILL cannot be immediately transmitted to the server 130, such as when the first cable 152 is separated from the first user computer 170-1, the log module 250 stores the violation log ILL in the memory 173-1 until it can be transmitted to the server 150. When the first cable 152 is restored, the log module 250 can transmit the violation log ILL stored in the memory 173-1 to the server 130 through the first cable 152 and the communication network 150, and the server 130 can transmit the received violation log ILL to the administrator computer 110.

According to embodiments, when the phone number of the smartphone 112 of the administrator is set in the log module 250 in advance, the log module 250 can transmit (or push) the violation log ILL to the smartphone 112 in real time even when the violation log ILL cannot be transmitted to the server 130, such as when the first cable 152 is separated from the first user computer 170-1.

Figure 3:
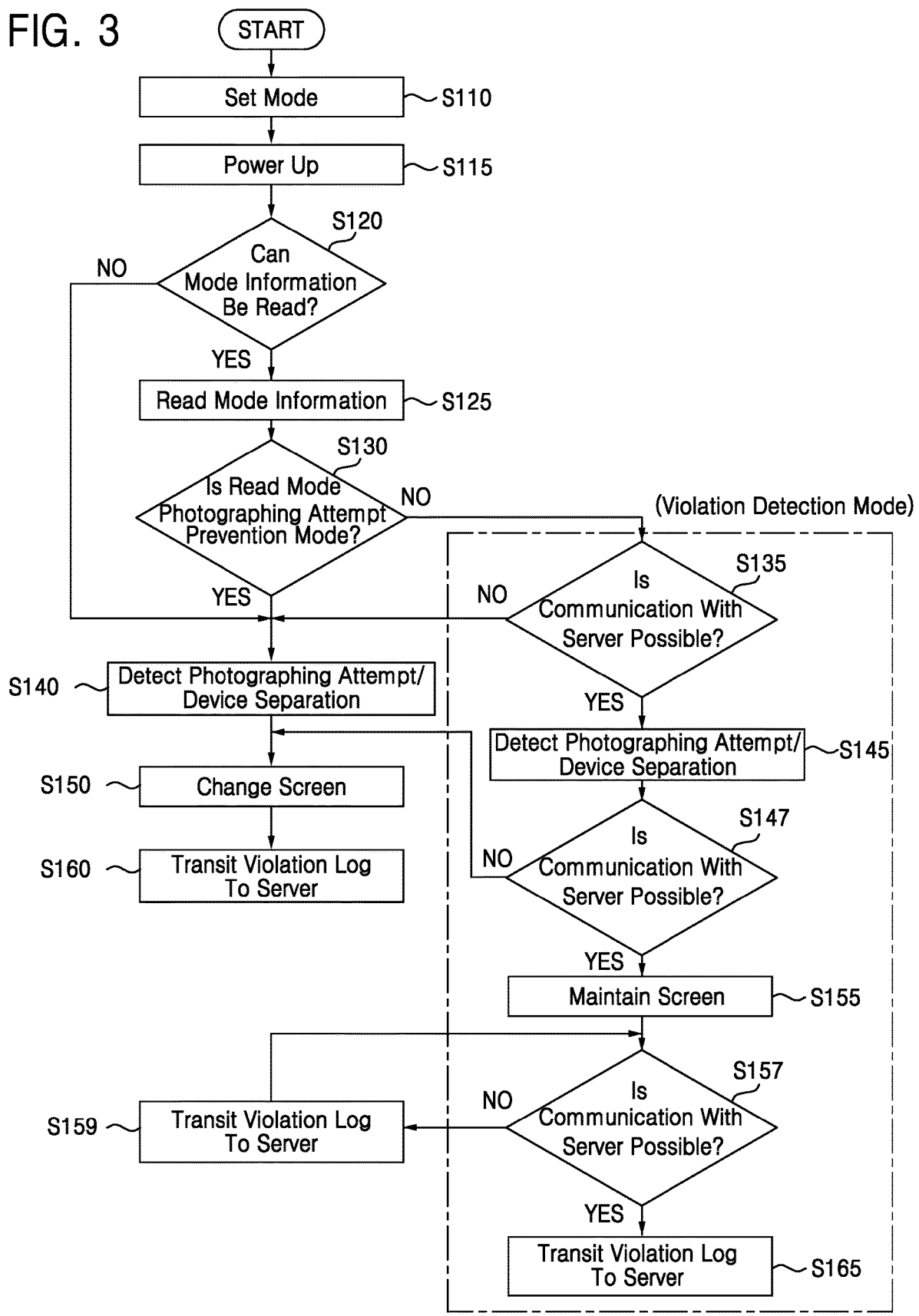
FIG. 3 is a flowchart that describes an operation of the computer program shown in FIG. 2.

FIG. 3 is a flowchart that describes an operation of the computer program shown in FIG. 2. Referring to FIGS. 2 and 3, an administrator sets operation mode information (MI) through the administrator computer 110. For convenience of explanation, it is assumed that the operation mode information MI indicates a photographing attempt prevention mode when the operation mode information MI is set to a first value (for example, data "0"), and the operation mode information MI indicates a violation detection mode when the operation mode information MI is set to a second value (for example, data "1").

When the administrator sets the operation mode information MI to the first value through the administrator computer 110, the server 130 receives and stores the operation mode information MI set to the first value (S110).

When the first user computer 170-1 is powered up (booted or in a standby state in which the computer program 200-1 can be executed) (S115), the computer program 200-1 determines whether the operation mode information MI can be read from the server 130 (S120).

A case in which the computer program 200-1 cannot read the operation mode information MI from the server 130 within a predetermined time (NO in S120), for example, a case in which smooth communication between the first user computer 170-1 and the server 130 is not possible, the computer program 200-1 executes a default mode set as a default. For example, the computer program 200-1 includes a function of determining an elapse of a predetermined time, the administrator can set the predetermined time to the server 130 using the administrator computer 110, and the predetermined time set to the server 130 can be transmitted to the computer program 200-1.

At this time, it is assumed that the default mode is the photographing attempt prevention mode. In the photographing attempt prevention mode, a display of an image (or an electronic document) requiring security on the monitor 180-1 is blocked or an image (or an electronic document) requiring security is forcibly changed to another image (or another electronic document) that does not require security, and therefore, it is possible to prevent the image (or the electronic document) requiring security from leaking illegally.

The case in which smooth communication between the first user computer 170-1 and the server 130 is not possible (NO in S135, NO in S147, and NO in S157) includes (i) a case in which a connection between the first user computer 170-1 and the communication network 150 is not smooth, (ii) a case in which the first cable 152 is broken, or (iii) a case in which the first cable 152 (for example, a LAN cable) is intentionally separated from the first user computer 170-1 (that is, a case in which an illegal photographer separates the first cable 152 from the first user computer 170-1 to illegally capture an image currently displayed on the monitor 180-1).

When the screen change control module 240 of the computer program 200-1 can read the operation mode information MI from the server 130 within a predetermined time (YES in S120), the screen change control module 240 reads the operation mode information MI from the server 130 (S125).

The screen change control module 240 determines whether a mode to be performed is the photographing attempt prevention mode based on a value corresponding to the operation mode information MI (S130).

As assumed previously, since the operation mode information MI is set to the first value (YES in S130), the screen change control module 240 can perform the photographing attempt prevention mode.

The computer program 200-1 detects a photographing attempt using the photographing attempt detection module 220, and detects a device separation using the device separation detection module 230 (S140).

The screen change control module 240 blocks an image currently displayed on the monitor 180-1 or changes it to another image in response to the detection of a photographing attempt by the photographing attempt detection module 220 and/or the detection of a device separation by the device separation detection module 230 (S150). As a result, an image which is subjected to illegal photographing is blocked or replaced with another image.

Figures 4, 5:
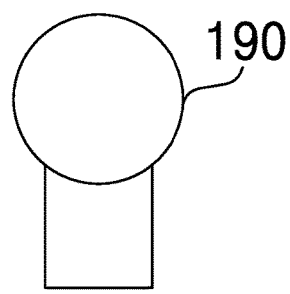
FIG. 4 is a warning screen displayed on a display device of a computer in a photographing attempt prevention mode.
FIG. 5 is an image that includes an image of an illegal photographer, which is generated in a violation detection mode.

FIG. 4 is a warning screen displayed on a display device of a computer in the photographing attempt prevention mode. The screen change control module 240 may generate a warning screen GUI1 as an example of blocking an image currently displayed on the monitor or changing it to another image, and transmits it to the monitor 180-1. The warning screen GUI1 can display a warning, and a date and time when photographing is attempted.

According to embodiments, the screen change control module 240 may cause a word processor that transmits an image (or a document) to the monitor 180-1 to stop the word processor, block a transmission of the image (or the document), or minimize a screen for displaying the image.

The log module 250 of the computer program 200-1 generates the violation log ILL described above in response to the detection of a photographing attempt by the photographing attempt detection module 220 and/or the detection of a device separation by the device separation detection module 230, and transmits the generated violation log ILL to the server 130 through the interface 175-1, the first cable 152, and the communication network 150 (S160).

For example, a screen change operation of the screen change control module 240 and a violation log generation operation of the log module 250 may be simultaneously performed.

When the administrator sets the operation mode information MI to the second value (for example, data '1') through the administrator computer 110, the server 130 stores the operation mode information MI set to the second value (S110).

When the first user computer 170-1 is powered up (or in a standby state in which the computer program 200-1 can be executed) (S115), the computer program 200-1 determines whether it can read the operation mode information MI from the server 130 (S120).

When the computer program 200-1 cannot read the operation mode information MI from the server 130 within a predetermined time (NO in S120), for example, when smooth communication between the first user computer 170-1 and the server 130 cannot be performed, the computer program 200-1 forcibly executes the default mode instead of the violation detection mode.

When the computer program 200-1 can read the operation mode information MI from the server 130 within a predetermined time (YES in S120), the computer program 200-1 reads the operation mode information MI from the server 130 (S125).

The computer program 200-1 determines whether a mode to be performed is the photographing attempt prevention mode based on the operation mode information MI (S130).

As assumed previously, since the operation mode information MI is set to the second value (NO in S130), the computer program 200-1 can perform the violation detection mode.

When smooth communication between the server 130 and the first user computer 170-1 is not possible (NO in S135), the computer program 200-1 forcibly changes the violation detection mode corresponding to the second value to the photographing attempt prevention mode.

When smooth communication between the server 130 and the first user computer 170-1 is possible (YES in S135), the computer program 200-1 detects a photographing attempt using the photographing attempt detection module 220, and detects a device separation using the device separation detection module 230 (S145).

When smooth communication between the server 130 and the first user computer 170-1 is not possible (NO in S137), the computer program 200-1 forcibly changes the set operation mode from the violation detection mode to the photographing attempt prevention mode. As a result, the screen change control module 240 of the compute program 200-1 blocks an image currently displayed on the monitor 180-1 or changes it to another image in response to the detection of a photographing attempt by the photographing attempt detection module 220 and/or the detection of a device separation by the device separation detection module 230 (S150).

When smooth communication between the server 130 and the first user computer 170-1 is possible (YES in S137), the screen change control module 240 maintains the image as it is without blocking an image currently displayed on the monitor 180-1 or changing it to another image (S155).

The log module 250 generates the violation log ILL in response to the detection of a photographing attempt by the photographing attempt detection module 220 and/or the detection of a device separation by the device separation detection module 230.

When smooth communication between the server 130 and the first user computer 170-1 is not possible (NO in S177), since the log module 250 cannot immediately transmit the generated violation log ILL to the server 130, the computer program 200-1 generates a violation log ILL and stores it in the memory 173-1 until smooth communication with the server 130 is possible (S159).

When smooth communication between the server 130 and the first user computer 170-1 is possible (YES in S177), the log module 250 transmits the generated violation log ILL or the violation log ILL stored in the memory 173-1 to the server 130 through the interface 175-1, the first cable 152, and the communication network 150 (S165).

FIG. 5 is an image that includes an image of an illegal photographer, which is generated in the violation detection mode. The administrator can check an image (GUI2) including an image of the illegal photographer 190 displayed on a monitor of the administrator computer 110. The administrator can take measures for exposing the illegal photographer 190.

When an illegal photographer uses his or her capture camera to capture a security-required image (or information) displayed on a display device of a computer illegally and unauthorizedly, a computer program stored in a storage medium according to the embodiment of the present invention can change the image to another image to immediately block the capturing of the image, or can display the image as it is to secretly detect the illegal photographer.

The computer program stored in a storage medium according to the embodiment of the present invention can detect an act of an illegal photographer attempting to capture or capturing a security-required image displayed on a display device of a computer using his or her capture camera illegally and unauthorizedly (for example, an act of taking a photo with the capture camera or an act of recording moving images) using a camera connected to the computer, and capture an evidence image of the act by the illegal photographer using the camera in real time while changing, at the same time, the image displayed on the display device to another image in real time according to a result of the detection.

In the method of providing illegal leakage prevention service of an image using a computer program stored in a storage medium according to the embodiment of the present invention, since an image of a person leaking security-required information displayed on the display device of a computer can be captured in real time, and the captured image can be transmitted to the administrator computer, the administrator can easily secure an evidence for the person who attempts to leak the information.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A non-transitory computer-readable storage media storing a computer program stored in a computer readable storage medium, the computer program causing a computer to prevent an illegal leakage of an image displayed on a display device of the computer comprising:
   receiving operation mode information from a server after the computer is booted;
   determining whether an operation mode of the computer program is a photographing attempt prevention mode or a violation detection mode based on the operation mode information;
   determining whether communication between the server and the computer is possible;
   executing the photographing attempt prevention mode when the operation mode is the photographing attempt prevention mode and the communication is possible; and
   executing, when the operation mode is the violation detection mode and the communication is not possible, forcibly the photographing attempt prevention mode even if the operation mode is the violation detection mode,
   wherein the computer program further comprises, in the photographing attempt prevention mode,
   detecting whether an illegal photographer captures the image displayed on the display device and outputting a first detection signal;
   detecting whether a peripheral device of the computer is separated from the computer and outputting a second detection signal;
   changing the image displayed on the display device to another image based on at least one of the first detection signal and the second detection signal; and
   generating a violation log and transmitting the violation log to the server based on at least one of the first detection signal and the second detection signal in the photographing attempt prevention mode,
   wherein the violation log includes:
   a photo of the illegal photographer taken by a camera of the computer, and
   an image displayed on the display device, which is subjected to illegal photographing.

2. The non-transitory computer readable medium of claim 1,
   wherein the outputting the first detection signal includes detecting whether the illegal photographer captures the image displayed on the display device using at least one of a camera of the computer and a microphone of the computer and outputting the first detection signal, and
   the peripheral device includes the at least one of the camera of the computer and the microphone of the computer.

3. The non-transitory computer readable medium of claim 1, further comprising:

executing the violation detection mode when the operation mode is the violation detection mode and the communication is possible, and wherein, in the violation detection mode, the computer program further comprising:

detecting whether an illegal photographer captures an image displayed on the display device and outputting a first detection signal, detecting whether a peripheral device of the computer is separated from the computer and outputting a second detection signal, and maintaining the image displayed on the display device without a change based on at least one of the first detection signal and the second detection signal.

4. The non-transitory computer readable medium of claim 3, further comprising:

in the violation detection mode, generating a violation log based on at least one of the first detection signal and the second detection signal;

determining whether the violation log is able to be transmitted to the server; and transmitting the violation log to the server when the violation log is able to be transmitted to the server and storing, when the violation log is not able to be transmitted to the server, the violation log in a memory of the computer until the violation log is able to be transmitted to the server.

5. A method of providing an illegal leakage prevention service of an image displayed on a display device of a computer, comprising:

setting, by an administrator, operation mode information to a server using an administrator computer;

requesting, by a computer program, a transmission of the operation mode information to the server after the computer executing a computer program is booted;

determining, by the computer program, whether an operation mode of the computer program is a photographing attempt prevention mode or a violation detection mode based on the operation mode information transmitted from the server;

determining, by the computer program, whether communication between the server and the computer is possible;

executing, by the computer program, the photographing attempt prevention mode when the operation mode is the photographing attempt prevention mode and the communication is possible;

executing, by the computer program, when the operation mode is the violation detection mode and the communication is not possible, the photographing attempt prevention mode forcibly even though the operation mode is the violation detection mode; and executing the violation detection mode when the operation mode is the violation detection mode and the communication is possible, wherein the computer program changes an image displayed on the display device to another image when an attempt to illegally leak the image displayed on the display device is detected by the computer program in the photographing attempt prevention mode, and the computer program maintains an image displayed on the display device without a change when an attempt to illegally leak the image displayed on the display device is detected by the computer program in the violation detection mode, wherein the attempt to illegally leak an image displayed on the display device is detected based on at least one of an image of a capture camera carried by an illegal leaker, which is captured using a camera of the computer, an image of a capture camera lens carried by the illegal leaker, which is captured using the camera of the computer, a flashlight that occurs at the time of photographing by a capture camera carried by the illegal leaker, and a photographing sound of the capture camera acquired by using a microphone of the computer, whether the camera of the computer is separated from the computer, and whether the microphone of the computer is separated from the computer.

* * * * *